(12) United States Patent
Papandreou et al.

(10) Patent No.: US 11,688,136 B2
(45) Date of Patent: Jun. 27, 2023

(54) 3D OBJECT MODEL RECONSTRUCTION FROM 2D IMAGES

(71) Applicant: Snap Inc., Santa Monica, CA (US)

(72) Inventors: Georgios Papandreou, London (GB); Iason Kokkinos, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/249,441

(22) Filed: Mar. 2, 2021

(65) Prior Publication Data

US 2021/0398351 A1 Dec. 23, 2021

(30) Foreign Application Priority Data

Jun. 22, 2020 (GB) ...................................... 2009515

(51) Int. Cl.
*G06T 17/20* (2006.01)
*G06N 20/00* (2019.01)
(52) U.S. Cl.
CPC .............. *G06T 17/20* (2013.01); *G06N 20/00* (2019.01); *G06T 2210/32* (2013.01); *G06T 2210/56* (2013.01); *G06T 2219/2016* (2013.01)
(58) Field of Classification Search
CPC . G06T 17/20; G06T 2210/32; G06T 2210/56; G06T 2219/2016; G06T 17/00; G06N 20/00; G06N 3/08; G06N 3/0454
See application file for complete search history.

(56) References Cited

U.S. PATENT DOCUMENTS

| 2017/0094243 A1* | 3/2017 | Venkataraman | ........ G06T 7/557 |
| 2019/0088004 A1* | 3/2019 | Lucas | ...................... G06T 15/06 |

(Continued)

FOREIGN PATENT DOCUMENTS

| CN | 109859296 A | * 6/2019 | ......... G06K 9/00382 |
| CN | 110197149 | 9/2019 | |

(Continued)

OTHER PUBLICATIONS

Georgios, Pavlakos, "Expressive Body Capture: 3D Hands, Face, and Body From a Single Image {with supplementary material)", IEEE CVF Conference on Computer Vision and Pattern Recognition (CVPR), {Jun. 15, 2019),1-22 (Year: 2019).*

(Continued)

*Primary Examiner* — Michael Le
(74) *Attorney, Agent, or Firm* — Schwegman Lundberg & Woessner, P.A.

(57) ABSTRACT

Systems and methods for reconstructing 3D models of human bodies from 2D images that counts for perspective and/or distortion effects are provided. The systems and methods include reconstructing a three-dimensional model of an object in a three-dimensional scene from a two-dimensional image comprising an image of the object. The systems and methods include determining an absolute depth of a key point of the object in the image; determining, using the absolute depth of the key point, a three-dimensional position of the key point in the three-dimensional scene; generating, using a neural network, a three-dimensional representation of the object, the three-dimensional representation comprising mesh nodes defined in a coordinate system relative to the key point; and positioning the three-dimensional representation of the object in the scene based on the position of the key point by applying a position dependent rotation to the three-dimensional object.

21 Claims, 13 Drawing Sheets

(56) References Cited

U.S. PATENT DOCUMENTS

| | | | |
|---|---|---|---|
| 2020/0105056 A1* | 4/2020 | Mitchell | G06N 3/08 |
| 2021/0150806 A1 | 5/2021 | Guler et al. | |
| 2021/0209797 A1* | 7/2021 | Lee | G06T 17/00 |

FOREIGN PATENT DOCUMENTS

| | | |
|---|---|---|
| WO | 2020088092 | 5/2020 |
| WO | 2021227694 | 11/2021 |
| WO | 2021262667 | 12/2021 |

OTHER PUBLICATIONS

CN-109859296-A (Machine Translation on Aug. 24, 2022) (Year: 2019).*

"International Application Serial No. PCT/US2021/038400, Invitation to Pay Additional Fees dated Oct. 12, 2021", 9 pgs.

Bogo, Federica, "Keep It SMPL: Automatic Estimation of 3D Human Pose and Shape from a Single Image", International Conference on Financial Cryptography and Data Security; [Lecture Notes in Computer Science; Lect. Notes Computer]. Springer. Berlin. Heidelberg, (2016), 561-578.

Georgios, Pavlakos, "Expressive Body Capture: 3D Hands, Face, and Body From a Single Image (with supplementary material)", IEEE CVF Conference on Computer Vision and Pattern Recognition (CVPR), (Jun. 15, 2019), 1-22.

Kato, Hiroharu, "Neural 3D Mesh Renderer", IEEE CVF Conference on Computer Vision and Pattern Recognition, IEEE, (Jun. 18, 2018), 3907-3916.

"United Kingdom Application Serial No. 2108595.6, Combined Search and Examination Report dated Dec. 17, 2021", 9 pgs.

"International Application Serial No. PCT/US2021/038400, International Search Report dated Dec. 3, 2021", 3 pgs.

"International Application Serial No. PCT/US2021/038400, Written Opinion dated Dec. 3, 2021", 10 pgs.

"International Application Serial No. PCT/US2021/038400, International Preliminary Report on Patentability dated Jan. 5, 2023", 12 pgs.

* cited by examiner

3D OBJECT MODEL RECONSTRUCTION FROM 2D IMAGES

CLAIM FOR PRIORITY

This present application claims the benefit of priority to U.K. Application No. 2009515.4, filed Jun. 22, 2020, which is herein incorporated by reference in its entirety.

TECHNICAL FIELD

This specification relates to reconstructing 3D models of humans from 2D images. In particular, this specification relates to systems and methods for reconstructing 3D models of human bodies from 2D images that counts for perspective and/or distortion effects.

BACKGROUND

Reconstruction of three-dimensional (3D) models of humans from two-dimensional (2D) images is a common problem in computer vision.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
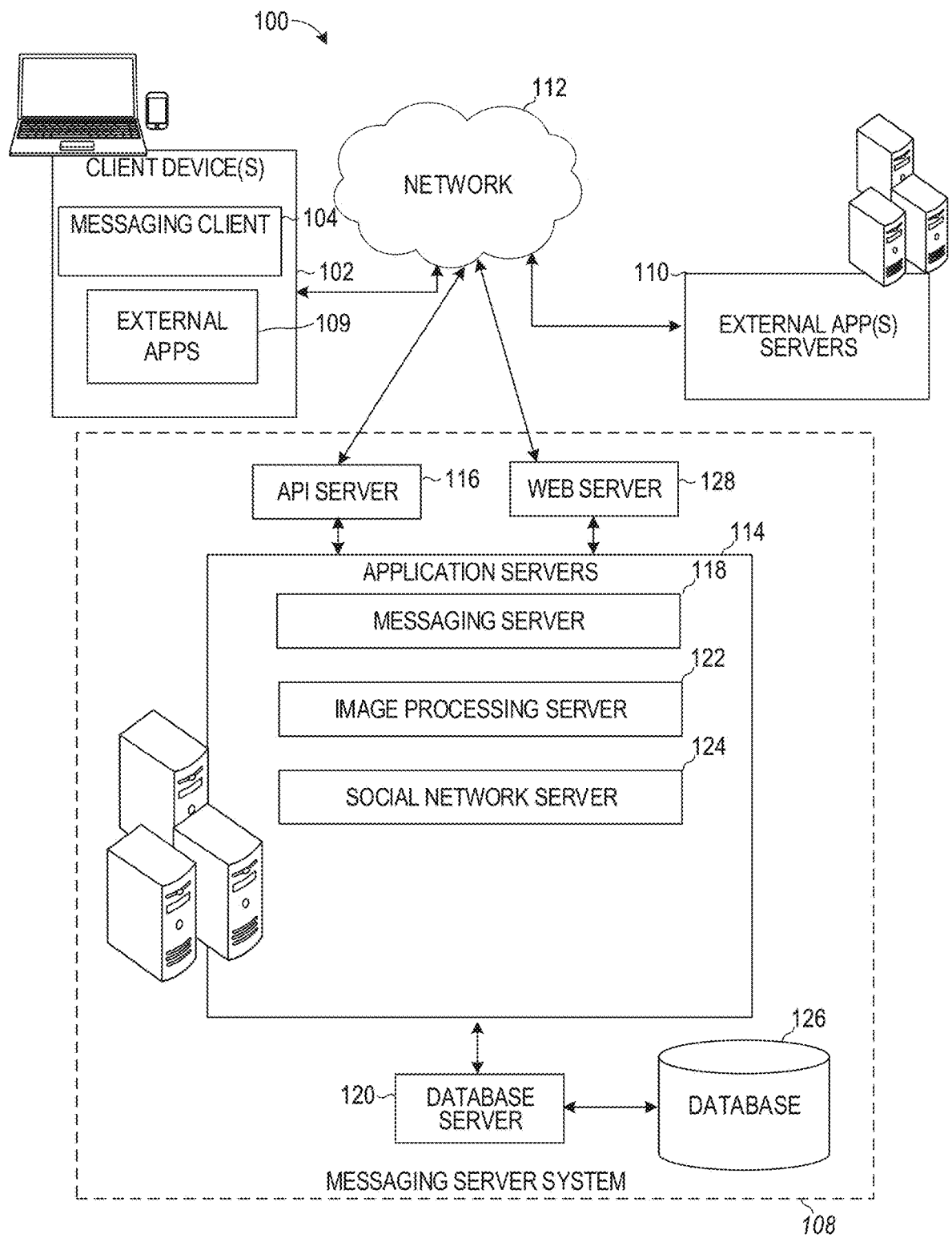
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

In the current literature, methods of reconstructing 3D human models are validated by comparing the model-based reconstruction within an image window to the 2D image using scaled orthographic projection. However, this is a crude approximation that is only valid to the extent that all of the person's body is lying at the same depth from the camera—e.g., like a cardboard parallel to the image plane. Perspective distortion makes itself noticeable as soon as the person gets closer to the camera, which is common for 'selfie' photographs. In these cases, the head, nose, or hand holding the camera is visibly magnified with respect to the more distant torso. This can lead to a breakdown of the orthographic approximation, resulting in 3D head/hand reconstructions that are noticeably smaller than their image counterparts are. Beyond this particular use case, incorporating perspective projection is necessary for downstream augmented reality applications, where the person needs to be correctly positioned within an environment reconstructed using metric coordinates.

In general, this specification relates to systems and methods for reconstructing 3D models of human bodies from 2D images that counts for perspective and/or distortion effects. Systems and methods described herein can allow more accurate 3D reconstructions of objects from 2D images than current methods. This specification relates to systems and methods for 3D interpretation of humans given an RGB image. Several aspects may be used to perform this task; these can be used either alone or in combination. In one aspect, an absolute depth of a key point of the object in the image is determined and used to determine a three-dimensional position of the key point. A 3D representation of the object is generated using a neural network and positioned with a 3D scene based on the 3D position of the key point. In one implementation, a position dependent rotation is applied to the 3D object to position the 3D representation of the object in the scene.

The position of the key point in the 3D scene can be determined by: determining, using the same or another neural network, an intersection of a ray connecting a camera that captured the two-dimensional image to the key point of the object with an image plane of the two-dimensional image and determining the position of the key point of the object in the coordinate system of the three-dimensional scene based on the world depth and the intersection. The position of the key point in the three-dimensional scene may be further determined based on a focal length of a camera that captured the two-dimensional image.

In one implementation, the positioned three-dimensional representation can be projected into a two-dimensional image plane to generate a projected image of the object. Parameters of the neural network can be updated based on comparing the locations of points in the projected image to the locations of corresponding points in the two-dimensional image.

In another aspect, a three-dimensional model of a human (e.g., an object) can be reconstructed in a three-dimensional scene from a two-dimensional image of the human. The three-dimensional model can include a directed graph where for each of node in the directed graph: a 3D offset field associated with an edge connecting the node to a previous node is estimated using one or more convolutional neural networks and based on a two-dimensional image coordinate of the previous node in the directed graph. A disparity in the vicinity the point associated with previous node is estimated. A three-dimensional coordinate for the node is determined using a three-dimensional coordinate of the previous node, the three-dimensional offset field and the estimated disparity.

In some implementations, a three-dimensional coordinate for the node can be estimated by: determining a two-dimensional image coordinate for the node based on the two-dimensional image coordinate of the previous node and two components of the three-dimensional offset field. A depth-coordinate of the node can be determined based on a depth coordinate of the previous node, one of the components of the three-dimensional offset field and the estimated disparity. The two-dimensional image coordinate for the node can be converted to a two-dimensional scene coordinate of the node using the depth-coordinate of the node or the estimated disparity associated with the node.

In some implementations, a depth-coordinate of the node can be determined based on a depth coordinate of the previous node by: determining an initial estimate of the depth coordinate based on the depth coordinate of the previous node, one of the components of the three-dimensional offset field and the estimated disparity. The initial estimate of the depth coordinate can be refined by translating the node in the depth direction by a constant value that represents a weighted average of a difference between a depth coordinate of each node and a disparity estimate of the depth of each node.

In some cases, the one or more convolutional neural networks may include: a first convolutional neural network configured to estimate a two-dimensional offset field in a plane associated with the two-dimensional image; and a second neural network configured to estimate a one-dimensional depth offset field in direction perpendicular to the plane.

In another aspect, a three-dimensional model of a human (e.g., an object) can be reconstructed from a two-dimensional image. The three-dimensional model can include joints having a joint position and a joint rotation. A known joint position for each joint is received and starting from a root joint, a joint pose is determined for the joint based on a recursive relationship defining the joint pose for the joint in terms of a joint pose for a previous joint, a pre-defined offset between the joint and the previous joint, a bone rotation and a bone scaling. The bone rotation (and, in some examples, scaling/translation) is determined based at least in part on the known joint position for each joint. The known joint position may include ground truth joint positions, for example determined using a motion capture process. The known joint positions may be estimated joint positions obtained using a convolutional neural network, e.g., a network trained to identify 3D positions of joint locations from 2D images.

The known joint positions may be estimated by combining joint positions estimated by one or more object part models with estimated three-dimensional key point positions of the object. Key point positions may, for example, be estimated by a CNN, or a disparity-based key point location method. Object part models may be models specialized in determining 3D models of particular object part, e.g., a hand model, a head model, a torso model etc. The object part model may be a CNN trained to generate a 3D representation (e.g., mesh) of a part of the object from a 2D mage of the object.

At least one of the joints in the three-dimensional model may be a joint with a single child joint, and the bone scaling for each of such joints is determined based on a predefined length between the joint and the child joint of the joint. The known length between the joint and the child joint of the joint may be determined based on a difference between the known position of the joint and the known position of the child node of the joint.

In one example, the recursion relation may be given by:

$$R_j = R_i E_j s_j B_j$$

for the joint rotation, $R_j$, of joint j, where $R_i$ is the joint rotation of the previous joint, i, $E_j$ is a pre-determined rotation offset between joint i and joint j, $s_j$ is the bone scaling of joint j and $B_j$ is the bone rotation of joint j; and $$t_j = t_i + R_i d_j$$

for the joint position $t_j$ of joint j, where $t_i$ is the joint position of the previous joint, i, and $d_j$ is a pre-determined position offset between joint i and joint.

According to a further aspect of this specification, there is described apparatus comprising one or more processors and a memory, the memory storing computer readable code that, when executed by the one or more processors, causes the system to perform a method according to any of the methods described herein.

According to a further aspect of this specification, there is described a computer program product comprising computer code that, when executed by a computing device, causes the computing device to perform any of the methods described herein.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118. Detailed functionality of the image processing server 122 is shown and described in connection with FIGS. 5-10.

In one example, the image processing server 122 implements one or more neural networks (e.g., convolutional neural networks—CNNs) that are trained to regress absolute depth and/or disparity of an object (such as a human) in an image, namely quantities that are invariant to a focal length of the camera capturing the image. This allows CNNs to be trained with images that come from cameras of different focal lengths. At test time the (given or estimated) camera focal length can be used to turn the regressed absolute depth/disparity back into metric depth.

In some examples, methods of lifting a rigid object into 3D that go beyond weak perspective are introduced. For example, image processing server 122 may introduce a correction that mitigates for distortion effects as further away from the camera center. Alternatively or additionally, a vertex-wise disparity estimate may be used to exactly re-project to 2D coordinates. In some examples, a self-calibration method for focal length estimation is used, where the minimization of a 2D re-projection objective delivers an estimate of the camera's focal length. This allows for matching a parametric model to an image with substantially lower errors, delivering both better fittings, and better supervision signals for distillation-based supervision. In some examples, a part-based 3D skeleton estimation method is used that handles depth variability within the same object by using locally constant, but globally varying disparity estimates. This can account for severe foreshortening effects, allowing the robust handling in situations where objects (e.g., hands or faces) are close to the camera.

In some examples, a closed-form inverse kinematics solution may be used to bridge the gap between parametric model-based (i.e., "top-down") approaches to monocular 3D body reconstruction, and CNN-based (or other "bottom-up" type model) predictions of 3D body joints. The method may incorporate hands, allowing us to obtain a pixel-accurate model-based interpretation of a body-hand. These examples may be used to fit a parametric model of a body, which obeys physical constraints on joint positions and orientations, to results of one or more bottom-up models, which in general do not contain such constraints. Furthermore, a 3D models of body parts from bottom-up models can effectively be "stitched together" by fitting a parametric model of the whole body to them.

Figure 3:
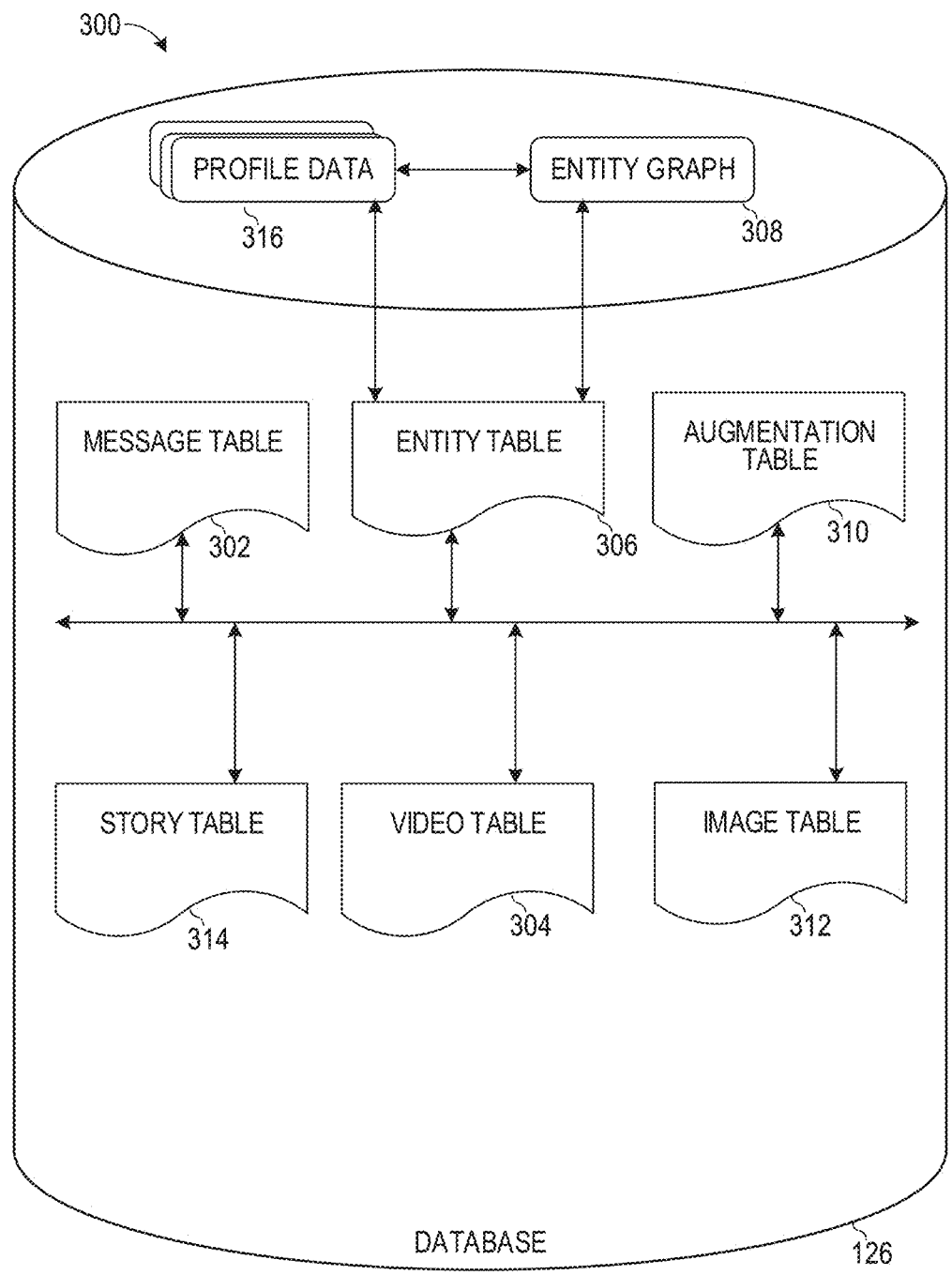
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
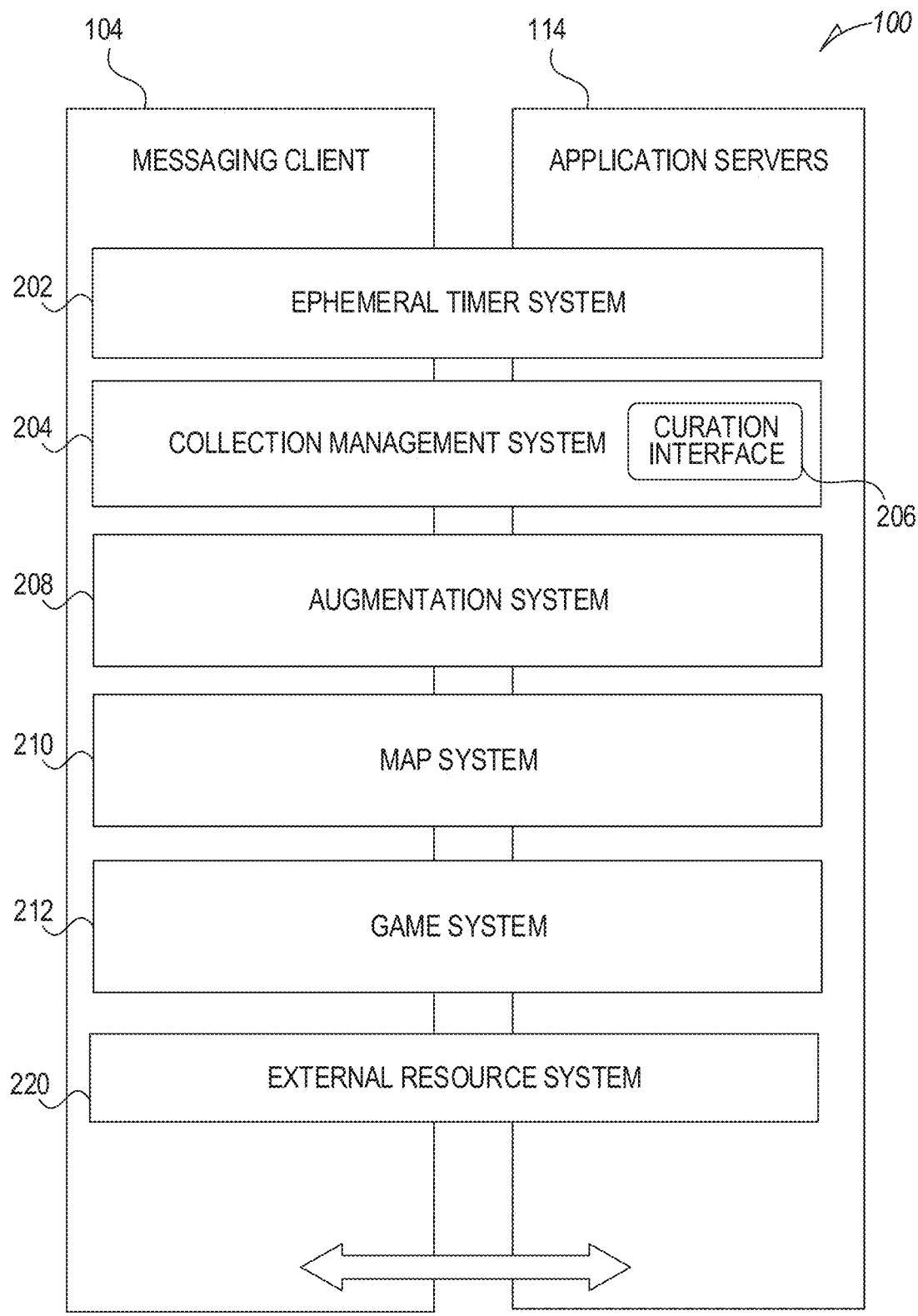
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video. Each augmented reality experience may be associated with one or more marker images. In some examples, when a marker image is determined to match a query image received from the client device 102, the corresponding augmented reality experience (e.g., the augmentation data) of the maker image is retrieved from the image table 312 and provided to the client device 102.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream: including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
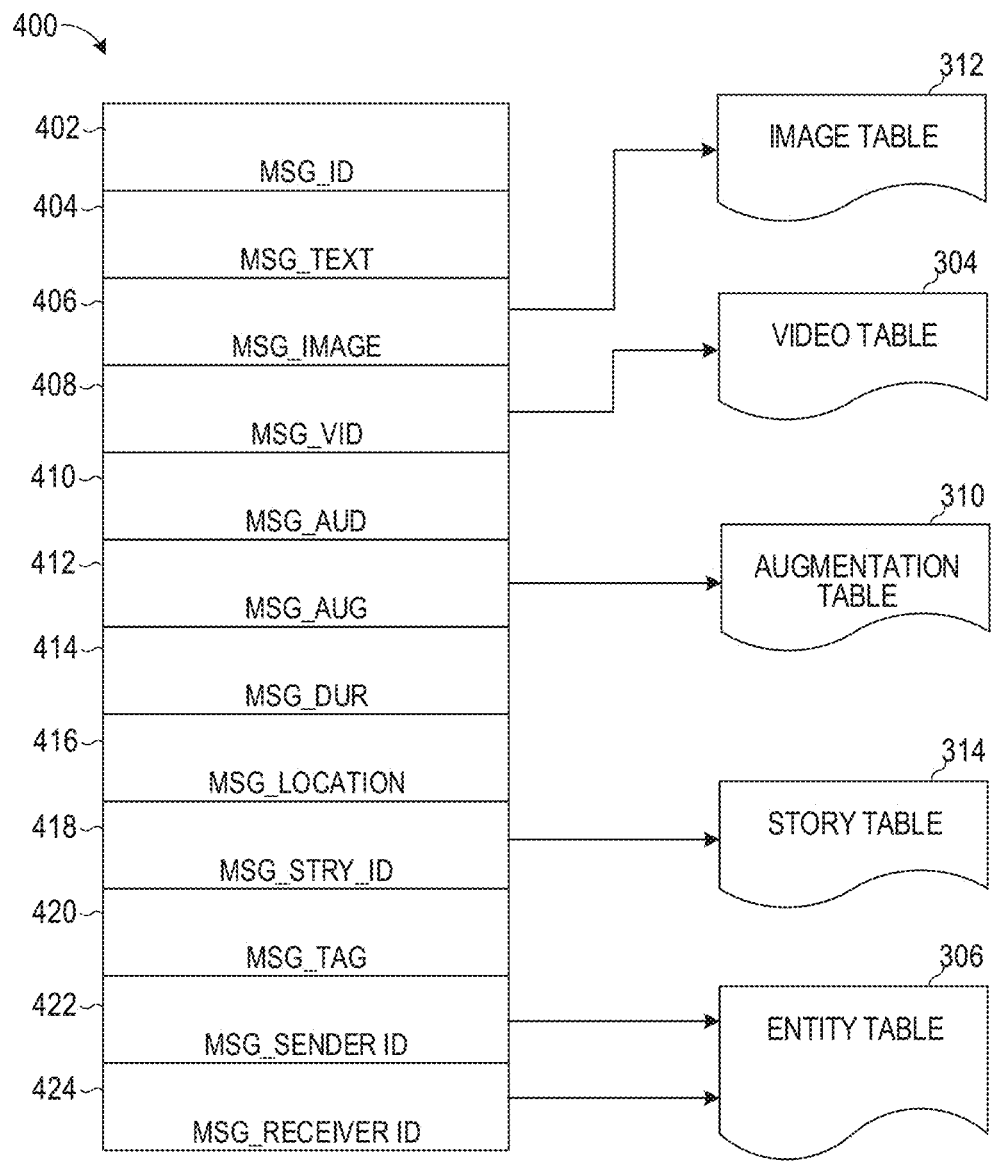
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
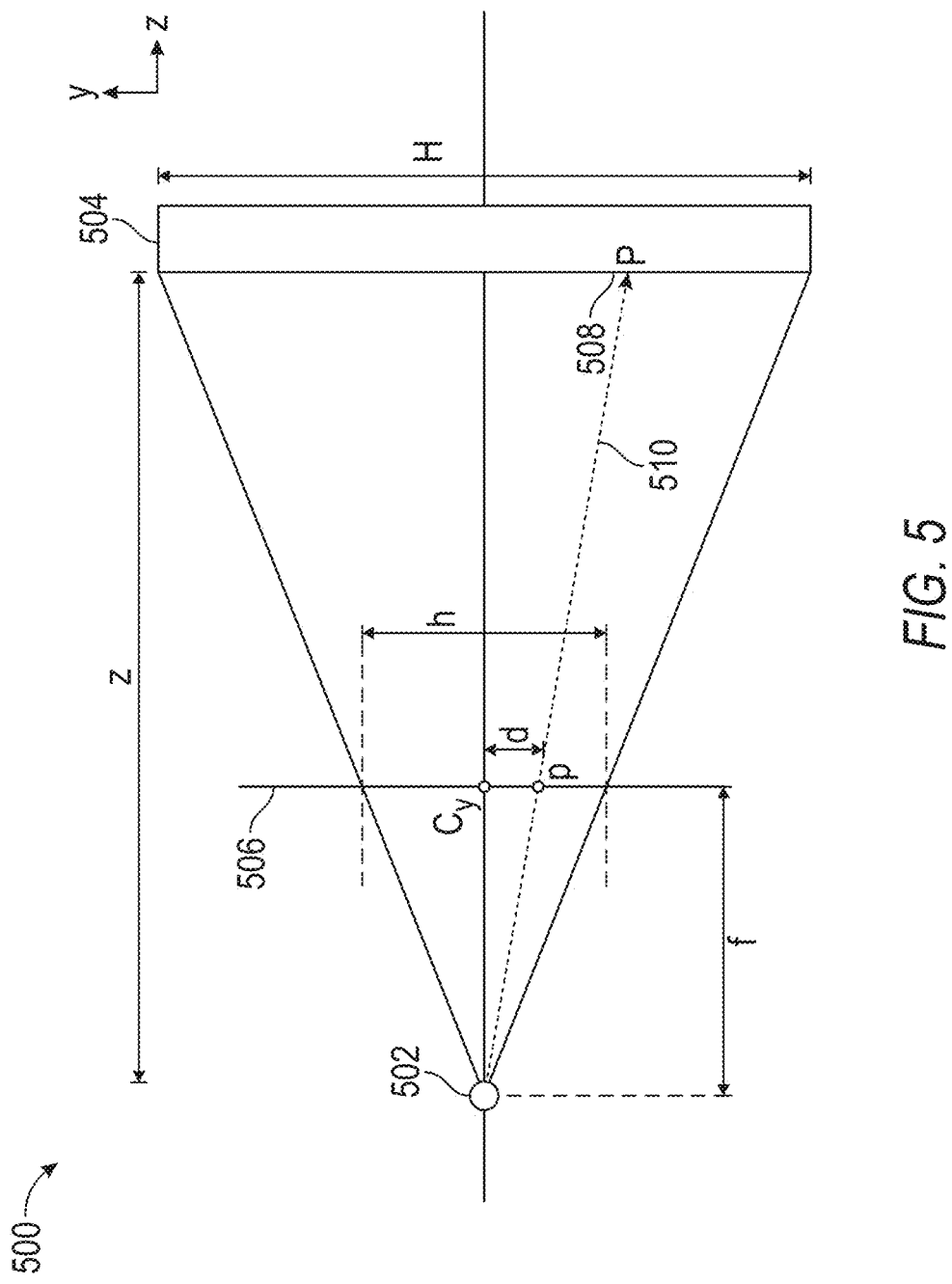
FIG. 5 shows an overview of the geometry of a camera capturing a two-dimensional image of an object in a three-dimensional scene, in accordance with some examples.

FIG. 5 shows an overview of the geometry 500 of a camera capturing a two-dimensional image of an object in a three-dimensional scene, according to some examples. The example shown shows only the y-axis (vertical) and z-axis (depth) axis of the three-dimensional scene; the x-axis (horizontal extends into the page).

The camera 502 is located at a first position, and captures an image of an object 504 (e.g., a human) in an image plane 506. The image plane is located at a focal length, f, from the camera 502 in the depth direction. The object has a height H in the three-dimensional scene, and is positioned at a depth Z from the camera. In the image plane 506 of the camera 502, the object has a height h.

The object 504 is associated with an object key point 508 (e.g., the pelvis or sternum of a human) located at a position P=[X, Y, Z] in the three-dimensional scene. A ray 510

(shown as a dotted line) connects the camera 502 to the key point 508, and intersects the image plane at a position p=[x, y, f] in the three-dimensional scene. This corresponds to a pixel position I=($i_x$, $i_y$) in the two-dimensional image captured by the camera. The distance between the principle point of the camera 502, c=($c_x$,$c_y$), and the intersection is given by d.

The object size in the image plane, h, can be converted into a pixel size, s, in the two-dimensional image using a camera sampling density, C. Using this, the pixel size is given by s=hC. Using similar triangles, H can be related to Z using:

$$\frac{H}{h} = \frac{Z}{f}$$

Rearranging this in terms of the pixel height, s, of the object gives:

$$Z = f\frac{H}{h} = Cf\frac{H}{s}$$

Thus, if H known (for example, by knowing the size often object a-priori, or from the output of a model of the object) an estimate of Z can be obtained from s if f is also known. However, given a test data set of images, often f and/or C are not known for the images.

This shortcoming can be overcome by training models using an "absolute depth", defined by:

$$Z_{abs} = \frac{H}{s} = \frac{Z}{Cf}$$

and converting this to "world depth", Z, at inference time, when knowledge of C and f are available. The absolute depth depends only on the real height of the object, H, and the pixel height of the object, s. The pixel height can be directly determined from the image, while the actual height may be estimated based on a model of the object. For (adult) humans, the height is generally constrained to lie in a relatively narrow range, and can be estimated using, for example, a BLSM model. In some examples, a convolutional neural network (or a branch of any of the networks described herein) may be used to determined pixel height of the object, s.

In some implementations, a CNN (or a branch of any of the CNNs described herein) can be used to determine the pixel coordinate of the intersection I=($i_x$, $i_y$) in the two-dimensional image captured by the camera. This can be converted to the key point 508 position using:

$$i_x - c_x = Cx \text{ and } i_y - c_y = Cy$$

and $$x = f\frac{X}{Z} \text{ and } y = f\frac{Y}{Z}$$

to give:

$$X = (i_x - c_x)Z_{abs}$$

and $$Y = (i_y - c_y)Z_{abs}.$$

Together with the definition of $Z_{abs}$, P is then given by:

$$P = [(i_x - c_x)Z_{abs}, (i_y - c_y)Z_{abs}, CfZ_{abs}]$$

Note that only the depth, Z, depends on the focal length of the camera.

Using current methods (e.g., BLSM networks for humans), a 3D representation of an object in a 2D image can be created using, for example a trained model/neural network. BLSM networks are discussed in greater detail in commonly-owned U.S. patent application Ser. No. 16/949,781, filed Nov. 13, 2020, which is incorporated herein by reference in its entirety. This representation is then positioned in a 3D scene using a determined position, P, of the object in the scene. For example, for a 3D representation in the form of a mesh in a mesh-coordinate system (e.g., relative to a key point of the object) with vertices {Bi}, it can be converted to vertices in the world coordinate system using:

$$V_i = B_i + P.$$

However, such a method does not account for distortion/perspective shifts of the object in the 2D image, particularly for objects that are located near the edge of the 2D image, or if the 2D image is taken at a low focal length, leading to an incorrect positioning/orientation of the 3D representation in the 3D scene. This in turn can lead to an incorrect projection of the 3D representation of the object back into the 2D image plane, which can adversely affect the training of a model for determining the 3D representation from the 2D image.

These problems are especially prevalent when using convolutional neural networks, since the translational invariance of the network cannot account for position dependent distortions in the image.

Figure 6A:
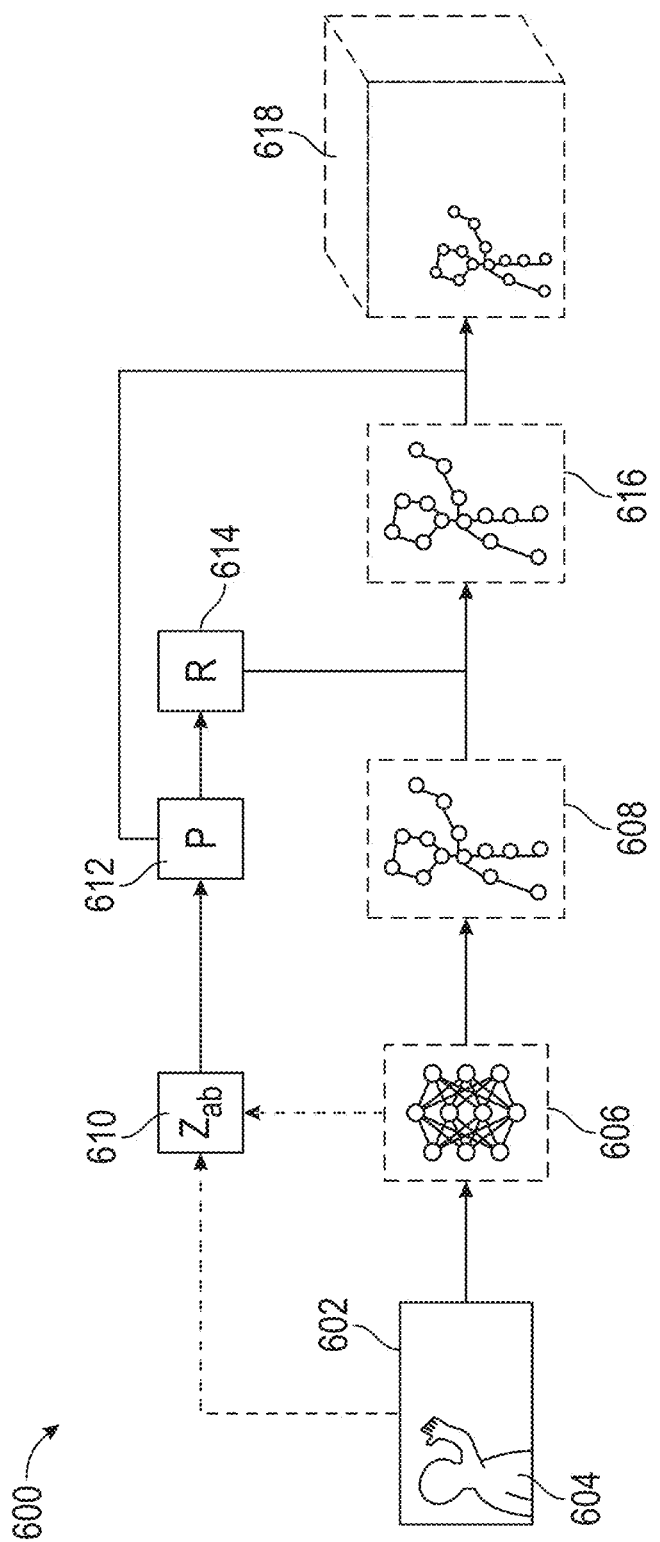
FIG. 6A shows an example of a method of reconstructing a three-dimensional object in a three-dimensional scene from a two-dimensional image, in accordance with some examples.

FIG. 6A shows an example of a method of reconstructing a three-dimensional object in a three-dimensional scene from a two-dimensional image, in accordance with some examples. FIG. 6A shows an example of a method 600 of reconstructing a three-dimensional object in a three-dimensional scene from a two-dimensional image containing the object that can account for such distortions/perspective shifts by applying a position dependent rotation to the three-dimensional representation of the object as a post-processing step.

A 2D image 602 comprising an image of the object 604 (in this example, a human) is received. A neural network 606 is used to generate a 3D representation 608 of the object 604. The absolute depth 610 of a key point (e.g., the sternum, the pelvis etc.) of the object 604 is also estimated from the 2D image 602, either using the neural network 606, a further neural network (not shown), or by some other model. The absolute depth is used to estimate a position 612, P, of the key point in the 3D scene, for example using the method described above in relation to FIG. 5. A rotation transformation 614, R, is determined from the determined position 612 and applied to the 3D representation 608 to create a rotated 3D representation 616. The rotated 3D representation is then positioned in the reconstructed 3D scene 618 using the position 612 of the key point.

The neural network 606 takes as input the 2D image, and generates a 3D representation of the object in the image from the image. An example of such a network 606 is the BLSM network, discussed above. The neural network 606 may be a convolutional neural network. The neural network 606 may be a fully convolutional neural network. Other suitable types of machine learning models can be used in alternative or addition to the neural network 606.

The 3D representation 608 may be any type of 3D representation known in the art. For example, the 3D representation 608 may be in the form of a mesh comprising multiple vertices. Other possible 3D representations 608 include, but are not limited to, directed graphs or undirected graphs.

The rotation transformation 614 applies a position dependent rotation to the 3D representation of the object 604. The rotation transformation 614 is determined based on the key point position P (defined as described above in relation to FIG. 5). For example, the rotation angle, θ, around the y-axis of the object (i.e., in the x-z plane) may be given by:

$$\theta = \arctan\frac{i_x}{f} = \arctan\frac{P_x}{P_z}$$

A similar expression applies mutatis mutandis to a rotation about the x-axis of the object (i.e., in the y-z plane).

In some examples, the focal length of the camera that captured the image 602 may be left as a free variable that is determined at inference time by fitting a re-projection (such the re-projection image 626 described below in relation to training the neural network 606) to the original image using a loss function (such as loss function 628 described below in relation to training the neural network 606).

The 3D scene 618 generated by the method 600 can be used to train the neural network 606 to correctly recreate a 3D representation of an object from a 2D image. An example of a method 620 of training the neural network 606 is shown in FIG. 6B.

Figure 6B:
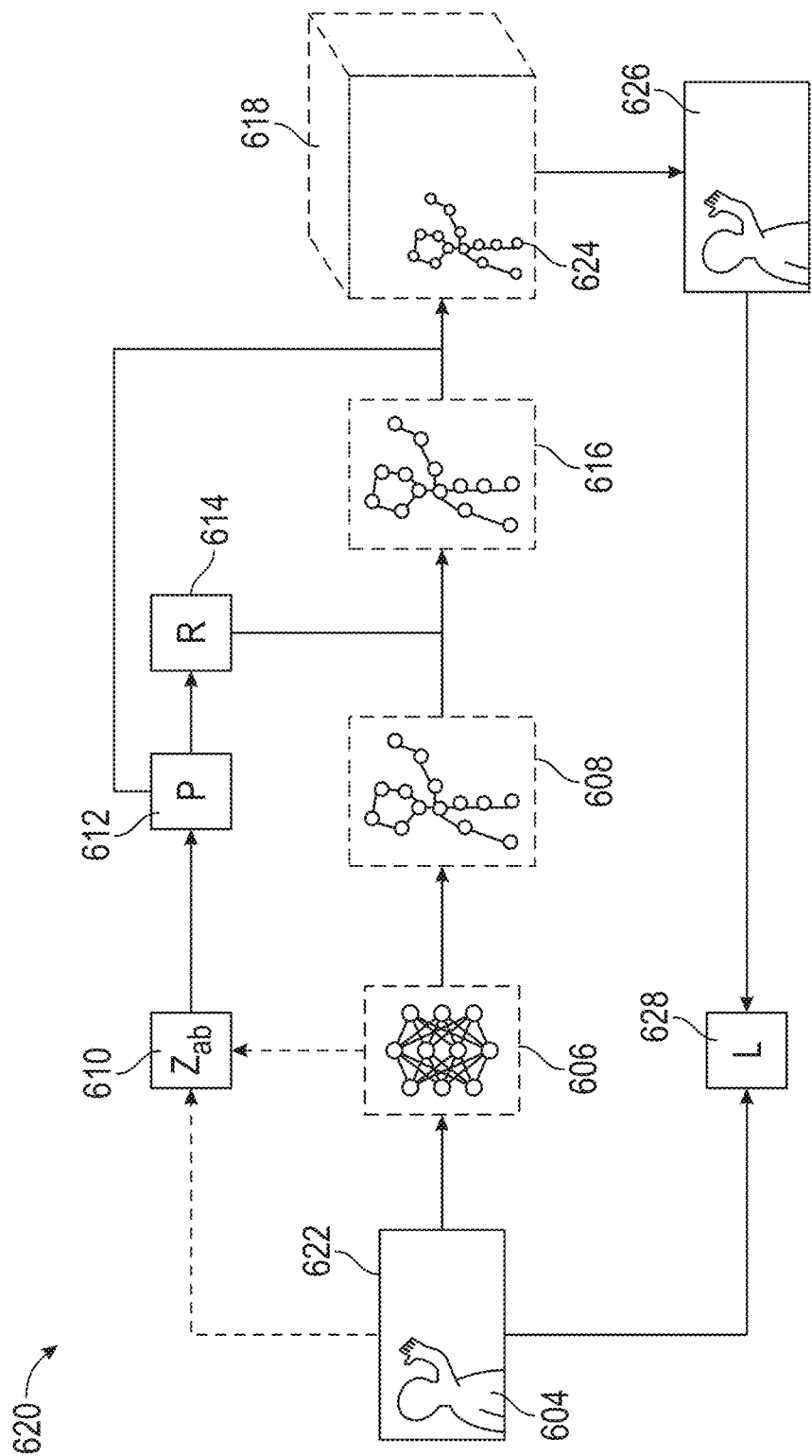
FIG. 6B shows an example of a method for training a neural network to correctly recreate a three-dimensional representation of an object from a two-dimensional image, in accordance with some examples.

FIG. 6B shows an example of a method for training a neural network to correctly recreate a three-dimensional representation of an object from a two-dimensional image, in accordance with some examples. The method proceeds similarly to FIG. 6A: a 2D training image 622 comprising an image of the object 604 of a given type (in this example, a human) is received from a training set of 2D images containing objects of the object type. A neural network 606 is used to generate a 3D representation 608 of the object 604 in the 2D training image 622. The absolute depth 610 of a key point (e.g., the sternum, the pelvis etc.) of the object 604 is also estimated from the 2D training image 622, either using the neural network 606, a further neural network (not shown), or by some other model. The absolute depth is used to estimate a position 612, P, of the key point in the 3D scene 618, for example using the method described above in relation to FIG. 5. A rotation transformation 614, R, is determined from the determined position 612 and applied to the 3D representation 608 to create a rotated 3D representation 616. The rotated 3D representation is then positioned in the reconstructed 3D scene 618 using the position of the key point.

The 3D representation 624 of the model in the reconstructed 3D scene 618 is projected into the image plane to generate a re-projected image 626. The re-projected image 626 is compared to the 2D training image 622 in order to determine updates to parameters of the neural network 606, for example using a loss function 628. For example, the loss function 628 may compare the position of points of the object in the re-projected image 626 to corresponding points in the training image 602. The points used for the comparison may be key points of the object 604, e.g., facial features and/or joints. The loss function 628 may be an L1 or L2 loss between these positions, though it will be appreciated that other examples are possible.

The parameter updates may be determined by applying an optimization procedure to the loss function 628. An example of such an optimization procedure is stochastic gradient descent, though it will be appreciated that other examples are possible. The parameter updates may be determined and applied after processing a batch of training images.

Figure 7:
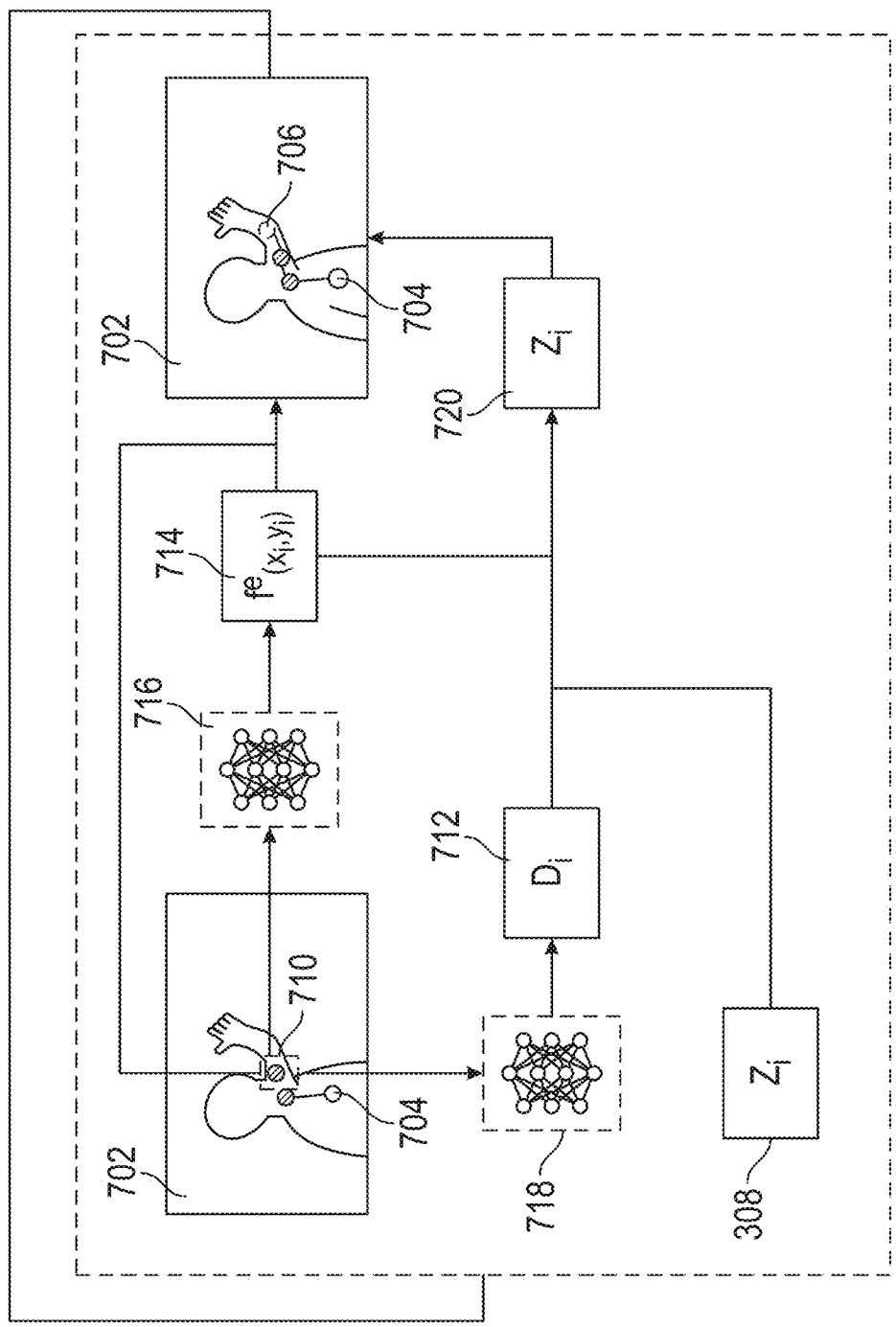
FIG. 7 shows an example of a method for estimating a three-dimensional pose of an object in an image, in accordance with some examples.

FIG. 7 shows an example of a method 700 for estimating a three-dimensional pose of an object (e.g., human) in an image 702. The 3D pose is an example of a 3D representation of an object. The method 700 is an iterative method, with one iteration shown in FIG. 7. The method 700 may be performed by a computer.

The 3D pose is in the form of a directed graph comprising a plurality of nodes with pairs of nodes connected by edges. Each edge may have a direction associated with it, i.e., start at one node and end at another node. The graph may center on a key point of the body, such as the sternum. In some examples, the directed graph may be star shaped. In other examples, the graph may be a tree structure, with mid-range edges connecting close by points on the human body skeleton. A plurality of the nodes may correspond to key points of the object, e.g., joints of the body.

The directed graph is built up iteratively starting from a root node 704 of the graph. At each iteration, a new node 706 is added to the graph based on the depth of a previous node 710, a disparity 712 estimated in the vicinity of the position of the previous node 710 of the directed graph and an estimated offset field 714 associated with an edge connecting the previous node 710 to the new node 706. The offset field 714 is estimated using one or more CNNs 716. One or more further CNNs 718 (which may be separate neural networks or additional branches of the one or more CNNs 716) are used to estimate the disparity in the vicinity of the position of the previous node 710. This is iterated until all nodes in the graph have been added.

The disparity is a measure of the rate of change in projected coordinates of an object with the corresponding world coordinates, i.e., for a point in 3D at location $(X_i, Y_i, Z_i)$ with 2D projection $(x_i, y_i)$ the disparity, $D_i$, is given by $f/Z_i$.

The position of the root node 704 may be determined at the start of the method 700 by identifying the 2D position of the root node 704 in the image 702 and determining the disparity in the region of the 2D image 702 using the one or more further CNNs 718. The 2D position of the root node 706 in the image may be identified using, for example, a heat map-based CNN representation. The root node 704 may correspond to a predetermined key point of the object, e.g., the sternum of a human. Alternatively, the root node 704 may be chosen based on the key points of the object that are visible in the 2D image, e.g., if the sternum is not visible, a joint of the human may be used as the root node 704.

The one or more CNNs 718 used to estimate the disparity have been trained to correctly compute disparity values in the vicinity of person key points using a large dataset of images annotated with 3-D key points or equivalent information obtained by fitting a parametric body model on 2-D images or a combination thereof.

The one or more CNNs 716 used to estimate the offset field 714 may be divided into a 2D branch and a depth branch. The 2D branch provides a 2D flow field in the x-y plane, $f_{2D}=(f_x,f_y)$, while the depth branch provides an offset field in the depth direction, $f_z$.

For the 2D coordinates of the new node 706 (i.e., coordinates in the x-y plane), a 2D pose estimation method may be used. Given a two position of the i-th node, $(x_i, y_i)$, the 2D position of the j-th node may be estimated using the 2D offset field associated with edge, $e_{ij}$, connecting the j-th node to the i-th node by adding the 2D offset field to the 2D position of the i-th node. The 2-D offset field, $f_{2D}$, is predicted by 2D branch of the one or more CNNs 716, which have specifically been trained to connect adjacent points in the kinematic tree graph of the object (person) using a large dataset of images annotated with 2-D key points.

The depth coordinate of new node 706 may be estimated using the disparity 712 estimated by the one or more further CNNs 716 and the depth offset estimated by the branch of the one or more CNNs 716 by adding the ratio of the depth offset $f_z$ to the disparity to the depth coordinate of the current node 706.

This modularity allows the CNNs 716 to be more easily trained, e.g., using a combination of 2-D key point datasets (which are more abundant and easy to create using human annotations on in-the-wild images) and 3-D key point datasets (which are harder to create and are typically restricted to motion capture systems in indoor environments).

In some examples, a global depth correction may be applied to the determined position of the new node 706.

In some examples, the mesh nodes comprises key point nodes, each associated with a key point of the object/human, and leaf nodes, each associated with a point on the surface of the human. The leaf nodes are each connected to one or more nearest key point nodes by a directed edge. During the method, the three-dimensional coordinates of the key point nodes are determined before the three-dimensional coordinates of the leaf nodes, i.e., the "skeleton" of the model is determined first, followed by the surface.

Figure 8:
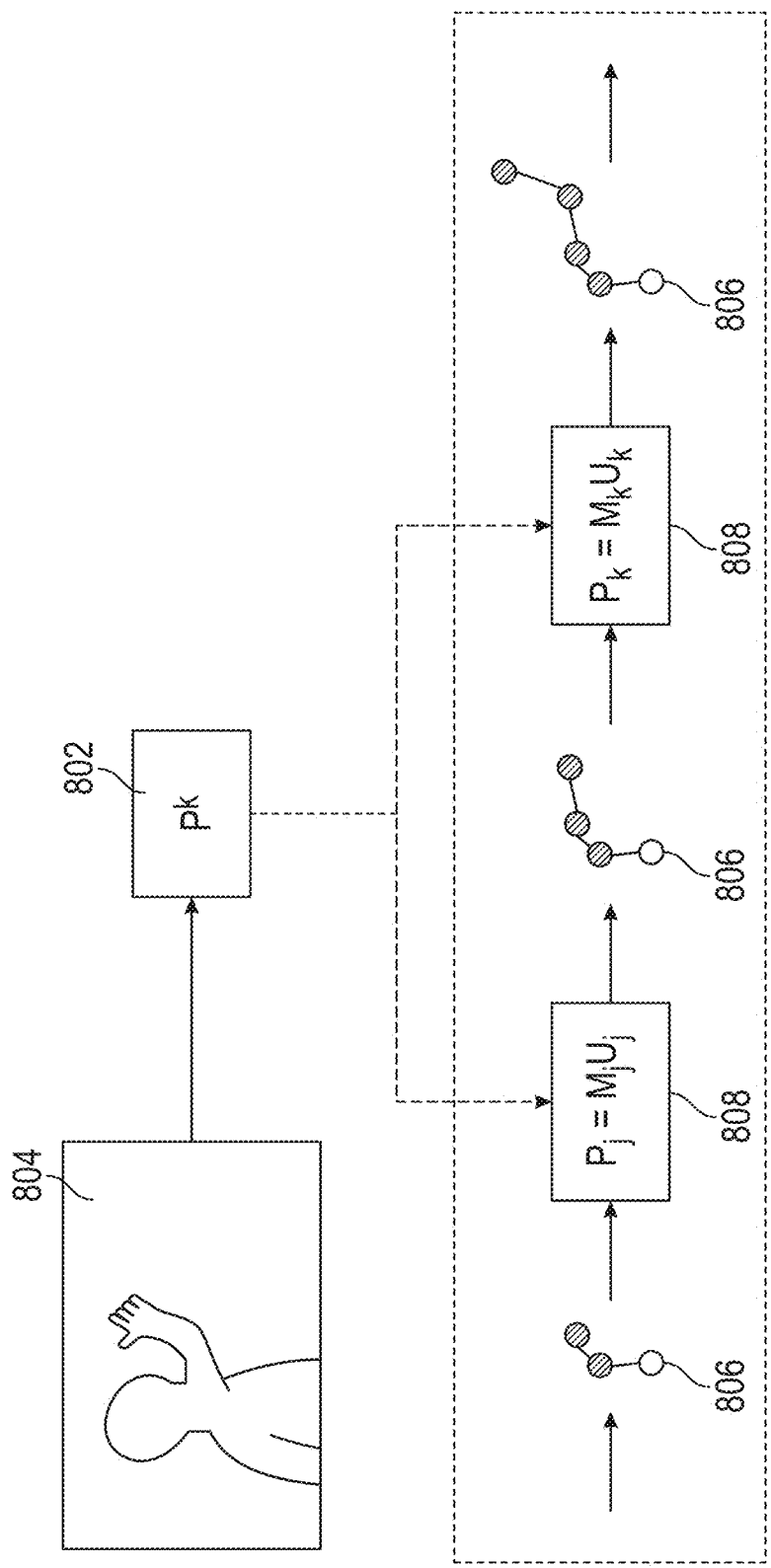
FIG. 8 shows an example of a further method for estimating a three-dimensional pose of an object in an image, in accordance with some examples.

FIG. 8 shows an example of a further method 800 for estimating a three-dimensional pose of an object (e.g., human) in an image 804. The 3D pose is an example of a 3D representation of an object. The method 800 is an iterative method. The method 800 may be performed by a computer.

In this method, the 3D representation of the object (e.g., human) is defined in terms of a set of joints, each joint associated with a joint pose comprising a joint position and a joint rotation.

A set of known joint positions 802, $P^k$, corresponding to joints of an object (e.g., human) in an image 804 are received. Starting from a root joint 806, a model of the object is recursively fitted to the known joint positions 802. The model provides a set of constraints on the allowed joint poses that are not present in the known joint positions 4802. For each joint, and starting from a root joint 806, a joint pose for the joint is determined based on a recursive relationship 808 that defines the joint pose for the joint in terms of a joint pose for a previous joint, a pre-defined (i.e., model defined) offset between the joint and the previous joint, a bone rotation and a bone scaling (related to bone length). The bone scaling and/or bone rotation are variables used to fit the model to the known joint positions 802.

The set of known joint positions 802 may, for example, be ground-truth positions (e.g., obtained through motion capture methods). Alternatively, the known positions may be positions output by a "bottom-up" model, such as CNN trained to identify joint positions in an image or disparity-based methods, such as those described above in relation to FIG. 7. The set of known joint positions 802 may also be referred to as "world targets" or "target positions". Each of the known joint positions may be denoted $w_i$.

Figure 9:
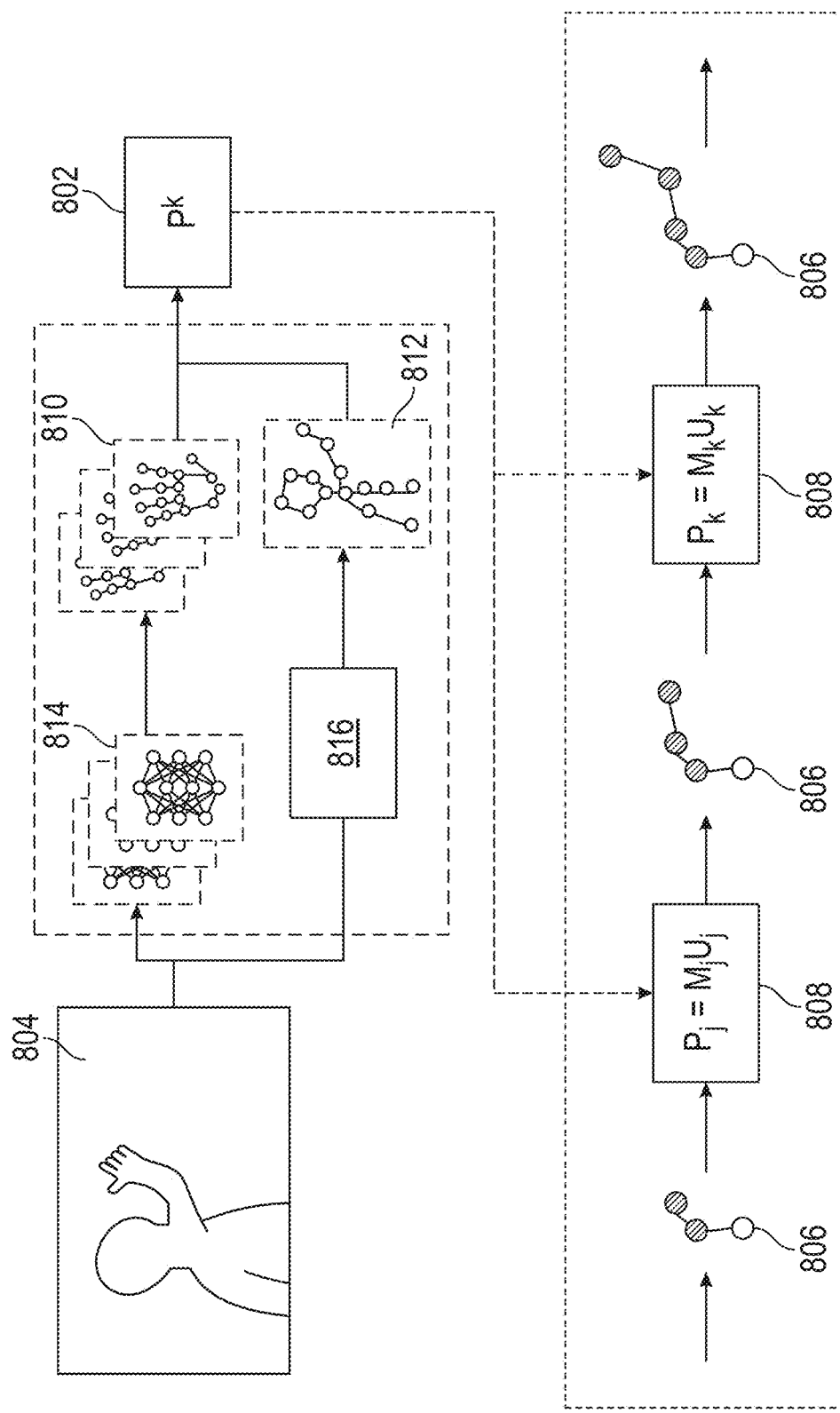
FIG. 9 shows an example of a variation of the method in FIG. 8, in accordance with some examples.

In some examples, the known joint positions 802 may be obtained by combining predictions from object part models. In these examples, as shown in FIG. 9, one or more (e.g., a plurality) of 3D representations of object parts 810 are combined with locations of key points 812 (also referred to as a 3D representation of the key points) of the object to generate the known joint positions 802.

The 3D representations of the object parts are each determined using a part-specific model 814. A part-specific model is a "bottom up" model, such a CNN trained to reproduce a 3D model/representation of a particular object part 810 (e.g., hands, feet, heads, faces, torsos etc.) from an image 804 containing the object. Each object part may be associated with a different CNN, or a different branch of one CNN. The 3D representation of the object part 810 may be in the form of a mesh of the object part. The 3D representation of the object part 810 may be defined in a coordinate system relative to a key point of the object part (e.g., a wrist joint for a hand, a sternum for a torso, an ankle joint for a foot, a facial feature for a head/face).

The locations of key points 812 of the object may be identified using a key point location method 816. The positions of key points of the object comprise 3D positions/coordinates of key features of the object (e.g., joint locations). An example of such a method a disparity based key point method, such as the method described in relation to FIG. 7. In some examples, a CNN may be used to identify the locations of the key points 812.

The one or more (e.g., a plurality) of 3D representations of object parts 810 are combined with locations of key points 812 of the object to generate the known joint positions 802. Key points of the object part 3D representations of the object parts 810 may matched with key points in the 3D representation of the key points 812, and positioned in 3D space accordingly. Any of the methods described in relation to FIG. 6A may be used to position the 3D object parts 810 in a manner that takes into account distortion in the 2D image 804, i.e., a position dependent rotation may be applied. Alternatively, the 3D object parts 810 may simply be placed at the corresponding key point.

The resulting known joint positions 802 form a crude 3D representation of the whole object that positions object parts at the correct depth and may account for distortions/perspective effects in the input 2D image 804. However, it may not correctly join up the different object parts 810 and may not obey object constraints. A parametrized 3D representation/model is therefore recursively fitted to the known joint positions 802 to determine an overall 3D representation of the object that does obey the constraints, but that also has accurate joint positions. This can bridge the gap between model-based approaches to monocular 3D body reconstruction, and CNN-based predictions of 3D body joints.

The parametrized 3D representation of the object comprises a plurality of joints, each associated with a joint pose, $P_i$. The joint pose comprises a joint position, $t_i$, (i.e., the 3D position of the joint in space) and a joint rotation, $R_i$, (i.e., the 3D orientation of the joint in space, for example defined by a 3×3 rotation matrix). The pose may be represented by a 4×4 matrix:

$$P_i = \begin{bmatrix} R_i & t_i \\ 0 & 1 \end{bmatrix}.$$

Starting from a root joint 806 (i.e., i=0), the joint pose of a current joint, j, is determined from the joint pose of a previous joint, i, using a recursive relationship 808. First, a known (i.e., model-defined) offset, $O_j$, if applied to the joint pose of the previous joint, $P_i$. The known offset encodes the fixed relationships between joints, e.g., constraints on positions and rotations of joints relative to one another. The offset may comprise a position offset, $d_j$, and a rotation offset $E_j$. The offset may be represented by a 4×4 matrix:

$$O_i = \begin{bmatrix} E_i & d_i \\ 0 & 1 \end{bmatrix}.$$

The product of the joint pose of the previous joint and the offset matrix, $M_i$, converts the relative displacement/rotation of the joints into an absolute position.

A variable matrix, $U_i$, is applied to the product of the joint pose of the previous joint and the offset matrix to give the joint pose of the current node, $P_j$. The variable matrix comprises a bone scaling, $s_j$, and a bone rotation matrix, $B_j$, i.e., it is the combination of a rotation and a scaling transform. This may be represented symbolically as:

$$U_j = M_j U_j \text{ where}$$

$$U_j = \begin{bmatrix} s_j B_j & 0 \\ 0 & 1 \end{bmatrix}.$$

The recursion relationship 808 for the joint position and joint rotation is, in these examples, thus given by:

$$R_j = R_i E_j s_j B_j$$

and $$t_j = t_i + R_i d_j$$

though the skilled person will appreciate that equivalent formulations may alternatively be used.

The bone rotation angles are used as parameters to fit the parametrized 3D representation to the known joint positions 802. The bone scaling may also be used as an additional parameter for the fitting, or may be fixed by the parametrized model.

In some implementations, at least one of the joints in the parametrized 3D representation is a joint with a single child joint, k (i.e., with only one further joint dependent on its joint pose). The bone scaling for each such joint may be determined based on a predefined length between the joint and the child joint of the joint, e.g., by ensuring that the distance between the joint and its child node is correct using a known distance between them. The known length between the joint and the child joint of may be determined based on a difference between the known position of the joint, $w_j$, and the known position of the child node of the joint, $w_k$. One or more of the bone rotation angles for such a joint may be determined by ensuring that the location of the child joint matches the known location of the child joint.

In some implementations, at least one of the joints in the three-dimensional model is a multi-joint on which a plurality of child joints depends. The bone rotation matrix and bone scaling are thus overdetermined for such a joint. The bone rotation and/or bone scaling for each multi-joint may therefore be determined based on minimizing a difference between the estimated child node positions determined using the known (i.e., target) joint positions for the multi-joint.

The method is repeated for every joint in the object until all the joint poses have been determined.

FIG. 9 shows an example of a variation of the method in FIG. 8, in accordance with some examples.

Figure 10:
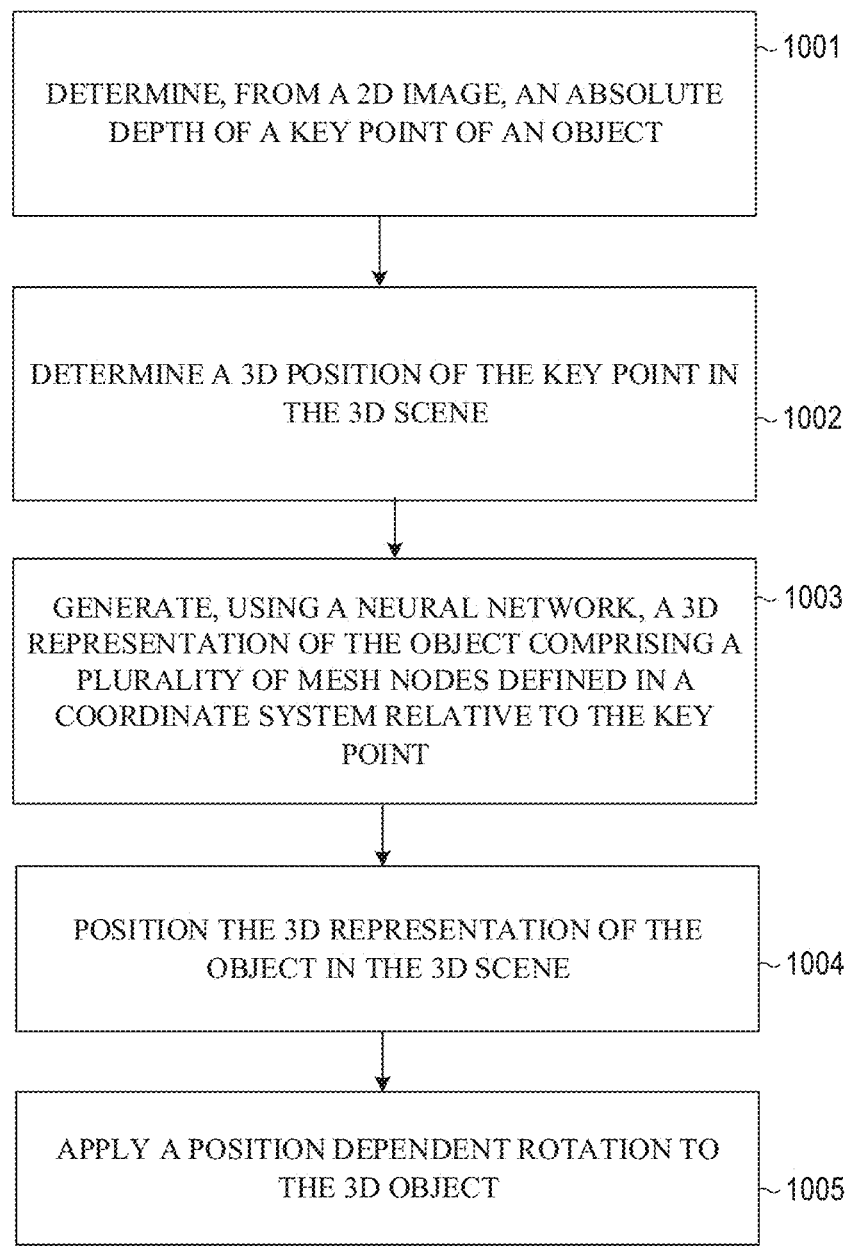
FIG. 10 is a flowchart illustrating example operations of the messaging application server, according to examples.

FIG. 10 is a flowchart illustrating example operations of the messaging client 104 in performing process 1000, according to examples. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other examples at least some of the operations of the process 1000 may be deployed on various other hardware configurations. The operations in the process 1000 can be performed in any order, in parallel, or may be entirely skipped and omitted.

At operation 1001, the image processing server 122 determines, from a two-dimensional image, an absolute depth of a key point of the object in the image.

At operation 1002, the image processing server 122 determines, using the absolute depth of the key point, a three-dimensional position of the key point in the three-dimensional scene.

At operation 1003, the image processing server 122 generates, using a neural network, a three-dimensional representation of the object, the three-dimensional representation comprising a plurality of mesh nodes defined in a coordinate system relative to the key point.

At operation 1004, the image processing server 122 positions the three-dimensional representation of the object in the three-dimensional scene based at least in part on the position of the key point.

At operation 1005, the image processing server 122 applies a position dependent rotation to the three-dimensional object.

Machine Architecture

Figure 11:
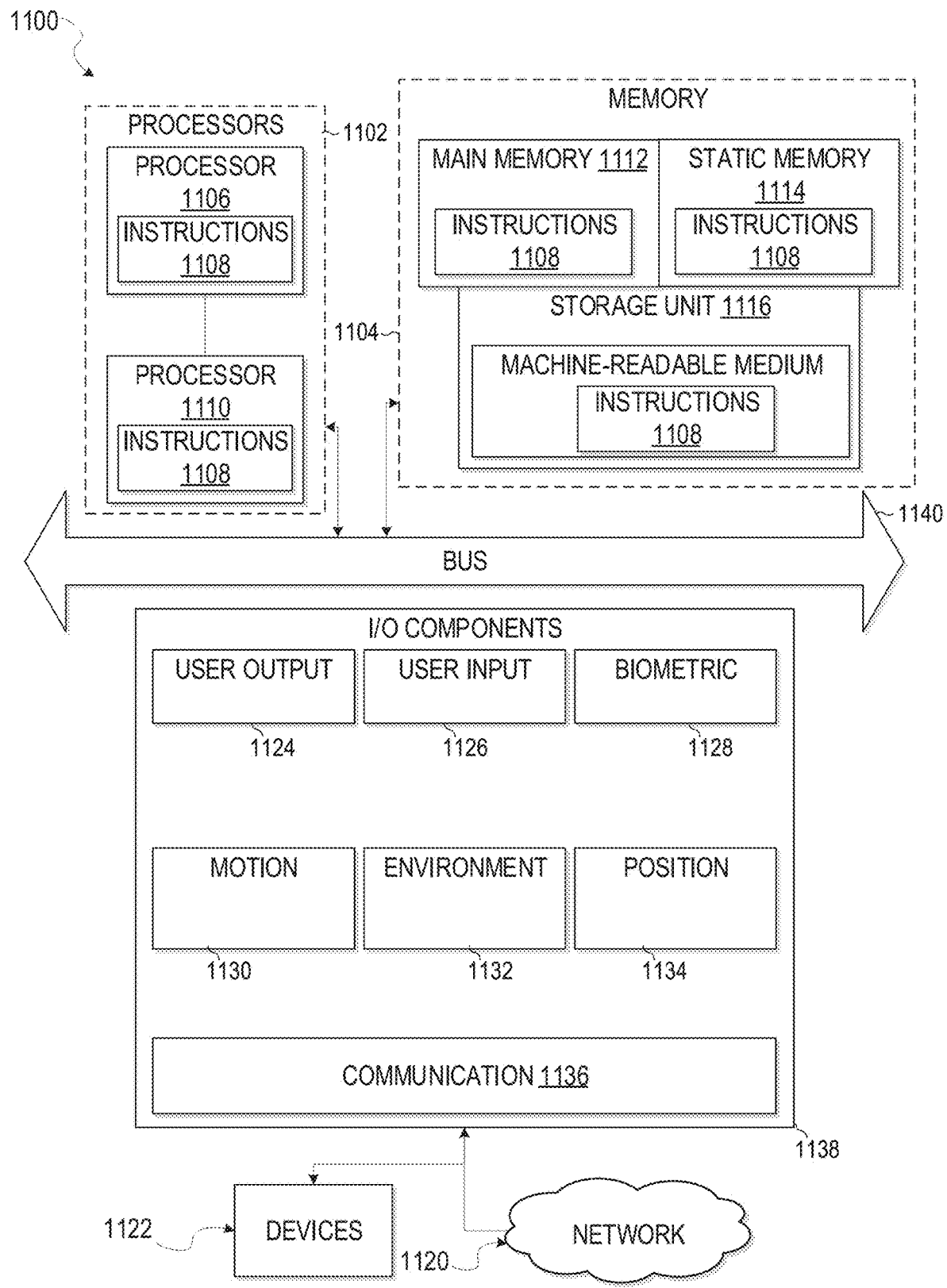
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
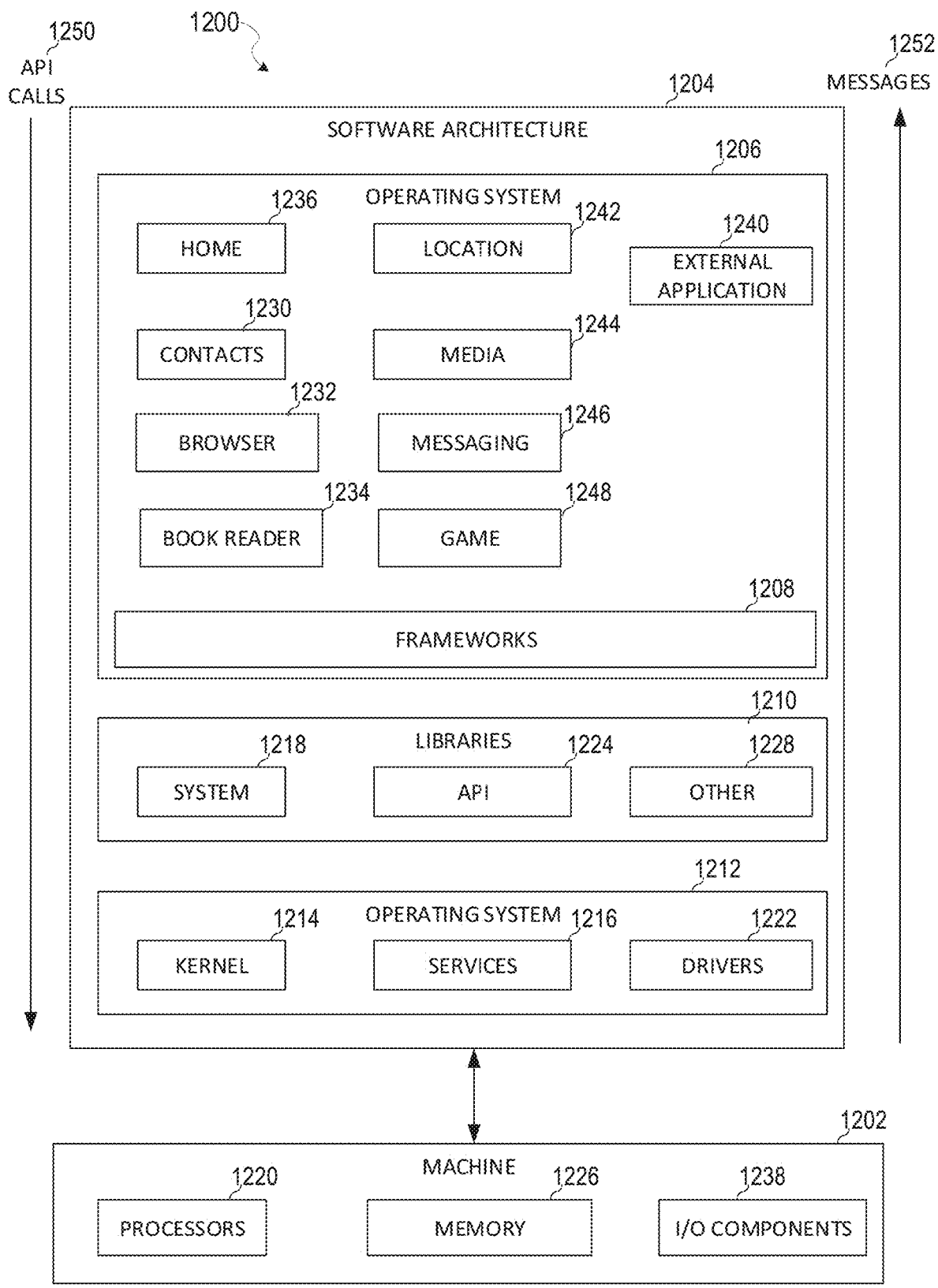
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method of reconstructing a three-dimensional model of an object in a three-dimensional scene from a two-dimensional image comprising an image of the object, the method comprising:
   determining a size of the object in an image plane of a camera used to capture the image;
   converting the size of the object in the image plane into a pixel size based on a camera sampling density of the camera used to capture the image;
   determining, from the two-dimensional image, a depth of a key point of the object in the image based on the size of the pixel size of the object using similar triangles;
   determining, using the depth of the key point, a three-dimensional position of the key point in the three-dimensional scene;
   generating, using a neural network, a three-dimensional representation of the object, the three-dimensional representation comprising a plurality of mesh nodes defined in a coordinate system relative to the key point; and
   positioning the three-dimensional representation of the object in the three-dimensional scene based at least in part on the three-dimensional position of the key point,
   wherein positioning the three-dimensional representation of the object comprises applying a position dependent rotation to the three-dimensional representation of the object.

2. The method of claim 1, wherein determining the three-dimensional position of the key point in the three-dimensional scene comprises:
   determining, using the same or another neural network, an intersection of a ray connecting a camera that captured the two-dimensional image to the key point of the object with an image plane of the two-dimensional image; and
   determining the three-dimensional position of the key point of the object in the coordinate system of the three-dimensional scene based on a world depth and the intersection.

3. The method of claim 1, wherein determining the three-dimensional position of the key point in the three-dimensional scene is further based on a focal length of a camera that captured the two-dimensional image.

4. The method of claim 1, wherein the position dependent rotation is a rotation by an angle dependent on a ratio of a two components of the three-dimensional position of the key point, wherein one of the two components is a depth component.

5. The method of claim 1, further comprising:
   projecting the positioned three-dimensional representation into a two-dimensional image plane to generate a projected image of the object;

comparing locations of points in the projected image to the locations of corresponding points in the two-dimensional image; and updating parameters of the neural network based on the comparing.

6. The method of claim 5, wherein projecting the positioned three-dimensional representation into a two-dimensional image plane is based at least in part on absolute depth of the key point and depths of the mesh nodes defined by the three-dimensional representation.

7. The method of claim 1, further comprising training a model using an absolute depth that is a function of the pixel size, the absolute depth being used to determine the depth of the key point.

8. The method of claim 1, further comprising:
projecting the three-dimensional representation of the object into the image plane to generate a re-projected image;
comparing the re-projected image with the image captured by the camera; and
determining one or more updates to the neural network based on the comparing of the re-projected image with the image captured by the camera.

9. The method of claim 8, further comprising:
computing a loss based on a position of a particular point of the three-dimensional representation of the object in the re-projected image with a corresponding point in the image captured by the camera.

10. A system comprising:
one or more processors configured to perform operations comprising:
determining a size of an object in an image plane of a camera used to capture an image depicting the object;
converting the size of the object in the image plane into a pixel size based on a camera sampling density of the camera used to capture the image;
determining, from the image, a depth of a key point of the object in the image based on the size of the pixel size of the object using similar triangles;
determining, using the depth of the key point, a three-dimensional position of the key point;
generating, using a neural network, a three-dimensional representation of the object, the three-dimensional representation comprising a plurality of mesh nodes defined in a coordinate system relative to the key point; and
positioning the three-dimensional representation of the object based at least in part on the three-dimensional position of the key point,
wherein positioning the three-dimensional representation of the object comprises applying a position dependent rotation to the three-dimensional representation of the object.

11. The system of claim 10, wherein determining the three-dimensional position of the key point comprises:
determining, using the same or another neural network, an intersection of a ray connecting a camera that captured the two-dimensional image to the key point of the object with an image plane of the two-dimensional image; and
determining the three-dimensional position of the key point of the object based on a world depth and the intersection.

12. The system of claim 10, wherein determining the three-dimensional position of the key point is further based on a focal length of a camera that captured the two-dimensional image.

13. The system of claim 10, wherein the position dependent rotation is a rotation by an angle dependent on a ratio of a two components of the three-dimensional position of the key point, wherein one of the two components is a depth component.

14. The system of claim 10, the operations further comprising:
projecting the positioned three-dimensional representation into a two-dimensional image plane to generate a projected image of the object;
comparing locations of points in the projected image to the locations of corresponding points in the two-dimensional image; and
updating parameters of the neural network based on the comparing.

15. The system of claim 14, wherein projecting the positioned three-dimensional representation into a two-dimensional image plane is based at least in part on absolute depth of the key point and depths of the mesh nodes defined by the three-dimensional representation.

16. The system of claim 10, the operations further comprising training a model using an absolute depth that is a function of the pixel size, the absolute depth being used to determine the depth of the key point.

17. The system of claim 10, the operations further comprising:
projecting the three-dimensional representation of the object into the image plane to generate a re-projected image;
comparing the re-projected image with the image captured by the camera; and
determining one or more updates to the neural network based on the comparing of the re-projected image with the image captured by the camera.

18. The system of claim 17, the operations further comprising:
computing a loss based on a position of a particular point of the three-dimensional representation of the object in the re-projected image with a corresponding point in the image captured by the camera.

19. A non-transitory computer readable medium comprising computer readable instructions that, when executed by one or more processors, configure the one or more processors to perform operations comprising:
one or more processors configured to perform operations comprising:
determining a size of an object in an image plane of a camera used to capture an image depicting the object;
converting the size of the object in the image plane into a pixel size based on a camera sampling density of the camera used to capture the image;
determining, from the image, a depth of a key point of the object in the image based on the size of the pixel size of the object using similar triangles;
determining, using the depth of the key point, a three-dimensional position of the key point;
generating, using a neural network, a three-dimensional representation of the object, the three-dimensional representation comprising a plurality of mesh nodes defined in a coordinate system relative to the key point; and
positioning the three-dimensional representation of the object based at least in part on the three-dimensional position of the key point, wherein positioning the three-dimensional representation of the object comprises applying a position dependent rotation to the three-dimensional representation of the object.

20. The non-transitory computer readable medium of claim 19, wherein determining the three-dimensional position of the key point comprises:

determining, using the same or another neural network, an intersection of a ray connecting a camera that captured the two-dimensional image to the key point of the object with an image plane of the two-dimensional image; and determining the three-dimensional position of the key point of the object based on a world depth and the intersection.

21. The non-transitory computer readable medium of claim 19, wherein determining the three-dimensional position of the key point is further based on a focal length of a camera that captured the two-dimensional image.

* * * * *